(12) United States Patent
Mohammadi et al.

(10) Patent No.: US 7,534,365 B2
(45) Date of Patent: May 19, 2009

(54) ULTRA-VIOLET ASSISTED ANISOTROPIC ETCHING OF PET

(75) Inventors: Saeed Mohammadi, Zionsville, IN (US); Shamsuddin Mohajerzadeh, Tehran (IR); Teimor Maleki, Tehran (IR)

(73) Assignee: Purdue Research Foundation, West Lafayette, IN (US)

( * ) Notice: Subject to any disclaimer, the term of this patent is extended or adjusted under 35 U.S.C. 154(b) by 169 days.

(21) Appl. No.: 11/189,285

(22) Filed: Jul. 26, 2005

(65) Prior Publication Data

US 2006/0024848 A1 Feb. 2, 2006

Related U.S. Application Data

(60) Provisional application No. 60/592,046, filed on Jul. 29, 2004.

(51) Int. Cl.
*C03C 15/00* (2006.01)
(52) U.S. Cl. .......................................... 216/94; 438/745
(58) Field of Classification Search .................. 216/90, 216/94; 438/745, 746; 374/179
See application file for complete search history.

(56) References Cited

U.S. PATENT DOCUMENTS

| | | | | |
|---|---|---|---|---|
| 4,877,480 A | * | 10/1989 | Das | 216/51 |
| 5,221,422 A | * | 6/1993 | Das et al. | 216/57 |
| 5,681,487 A | * | 10/1997 | Seki et al. | 216/94 |
| 6,009,888 A | * | 1/2000 | Ye et al. | 134/1.3 |
| 6,127,279 A | * | 10/2000 | Konuma | 438/745 |
| 6,508,948 B2 | | 1/2003 | Felker et al. | |

2005/0152813 A1 * 7/2005 Noh ........................... 422/129

FOREIGN PATENT DOCUMENTS

| JP | 03-253025 | * 11/1991 |
|---|---|---|
| JP | 08-277478 | * 10/1996 |

OTHER PUBLICATIONS

"A novel ultra-violet assisted anisotropic etching of plastic to realize micro-gears"; Sadeghi et. al.; (Apr. 1, 2004); Sensors and Actuators, A: Physical (Apr. 1, 2004'), A115 (2-3), pp. 563-570.*
"Farbrication of poly-germanium based thermopiles on plastic"; Moradi et. al.; Proceedings of IEEE Sensors; (Jun. 14, 2002'); pp. 594-597.*
"Application of PET plastics in micro-sensor fabrication"; Makki et. al.; Proceedings of the 15 th International Conference on Microelectronics; (Dec. 2003'); pp. 357-360.*
"Micro-machining of (100) Si using a novel ultra-violet induced anisotropic etching in HNA solution"; Haji et. al.; The 13 th International Conference on Microelectronics; ( Oct. 2001'); pp. 91-94.*

(Continued)

*Primary Examiner*—Kin-Chan Chen
(74) *Attorney, Agent, or Firm*—Barnes & Thornburg LLP

(57) ABSTRACT

A method for etching a substrate is described wherein a substrate is positioned in a solution of solvent and the substrate is exposed to excitation energy. The method may be applied to the production of thermocouple devices wherein the substrate is poly-ethylene-terephthalate.

10 Claims, 5 Drawing Sheets

OTHER PUBLICATIONS

"Plastic Micromaching Assisted by Ultraviolet Illumination"; Maleki et. al.; IEEE Transactions on Electron Devices; vol. 50; No. 8; (Aug. 2003'); pp. 1813-1815.*

Van Gerwen et al., "Thin-film-boron-doped polycrystalline silicon 70%-germanium 30% for thermocouples", *Sensors and Actuators*, vol. A.53, 1996, pp. 325-329.

Wagner et al., "Fabrication and testing of thermoelectric thin film devices", *IEEE*, 15th International Conference on Thermoelectrics, 1990.

Vilensky et al. "Investigation of latent tracks in polyethyleneterephtalate and their etching", *Nuclear Surface Science*, vol. 507-510, 2002. pp. 911-915.

Toufik et al., Improvement of performances of PET track membranes by plasma treatment, *Eur. Polymer Journal*, No. 38, 2002, pp. 203-209.

Stechenreiter et al., "Solvent-induced sensitization of ion tracks in PET analyzed by small-angle X-ray scattering and differential scanning calorimetry", *Nuclear Instrument*, 1995, pp. 200-203.

Rossier et al., "Plasma etching polymer microelectrochemical systems", *Lab on Chip*, vol. 2, 2002, pp. 145-150.

Roberts et al., "UV laser machined polymer substrates for the development of microdiagnostic systems", *Anal. Chem.*, vol. 69, 1997, pp. 2035-2042.

Ragsten et al., "Electrostatically excited diaphragm dirven as a loudspeaker", *Sensors and Actuators*, vol. A.52, 1996, pp. 211-215.

Nazmov et al., "Influence of irradiation of poly-ethyleneterephthalate films with X-ray upon the rate of dissolution on alkali water solution", *Nuclear Instruments and Methods in Nuclear Research*, vol. B.173, 2001, pp. 311-318.

Iwanishi et al., "In depth analysis of polymer etching by hydrogen plasma", *The Japan Society for Analytical Chemistry*, vol. 17, Analytical Sciences, 2001, pp. i391-i393.

Gao et al., "Miniaturized surface-driven electrostatic actuators: design and performance evaluation", *IEEE Trans. Mechatronics*, vol. 2, 1997, pp. 1-7.

Fortunator et al., Large area flexible thin position sensitive detectors, *Sensors and Actuators*, vol. A.86, 2000, pp. 182-186.

Dreuth et al., "Thermoplastic structuring of thin polymer films", *Sensors and Actuators*, vol. A.78, 1999, pp. 198-204.

Dadsetan et al., "Effect of CO2 laser radiation on the surface properties of polyethylene-terphthalate", *Radiat. Phys. Chem.*, vol. 56, 1999, pp. 597-604.

Apel et al., "Tracking etching technique in membrane technology", *Radia. Meas.*, vol. 34, 2001, pp. 559-566.

* cited by examiner

ULTRA-VIOLET ASSISTED ANISOTROPIC ETCHING OF PET

CROSS REFERENCE TO RELATED APPLICATION

This application claims priority to U.S. Provisional Application, Ser. No. 60/592,046, filed Jul. 29, 2004, the disclosure of which is fully incorporated herein by reference.

FIELD OF THE INVENTION

The present invention relates to an electronic device and a method thereof, particularly a method for etching a substrate.

BACKGROUND

Poly-ethylene-terephtalate (PET) is a favorable substrate for flexible electronic devices and trace membranes (Vilenskey et al., 2002; Toufik et al., 2002). PET is also well suited for many large area electronic applications, such as, displays and simple circuits (Gao at el., 1997; Ragsten et al., 1996). PET is a tough material that is chemically resistant to many solvents and cannot be easily dissolved to form membranes for many device applications. PET can tolerate temperatures as high as 120° C. although short thermal annealing at temperatures up to 150° C. has little effect on the physical characteristics of the substrate (Dreuth at el., 1999). PET may also be used as a track membrane acting as a molecular sieve for filtration (Vilenskey, 2002; Nazmov, 2001). Ultra-violet radiation has been used to accelerate the etching process (Apel, 2001).

Microstructure elements have dimensions in the micron range and production of these structures is important in precision engineering, mircooptics, microelectronics, micromechanics, and others. It is well known in the art that these microstructures may be produced from plastic, metal, or ceramic by the process of lithography, electroforming, and casting. Despite the advantages offered by the lithography process simpler processes are often desired. In the PET etching methods previously reported, irradiation by X-ray or bombardment by energetic ions are first used to create latent tracks followed by a chemical etching process (Vilenskey, 2002; Nazmov, 2001; Steckenreiter, 1995). Apart from these techniques, laser ablation and dry etching are used for the processing of PET substrates (Roberts, 1997; Dadsetan, 1999; Iwanishi, 2001; Rossier, 2002). The laser micro-machining is expensive and requires complex facilities.

Thermocouple devices are among the most frequently used sensors in many applications (Wagner, 1990). In the case of polysilicon-based thermocouple devices, the processing temperature exceeds 600° C. where many substrates such as PET cannot withstand. Metallic-based thermocouple devices require much lower temperatures during processing and fabrication of thermocouples can be added on thin rubber membranes and flexible bases (Fortunato, 2000). However, the low sensitivity of the junction makes the readout circuitry rather complex. Germanium can be processed at temperatures far below that of silicon and the junction sensitivity remains high. In addition, silicon-germanium alloys may be suitable for making high performance thermocouple based devices (Van Gerwen, 1996). Although realization of these high sensitivity thermocouples is possible on PET, the overall device performance requires formation of thin membranes on a plastic substrate.

SUMMARY

The present disclosure comprises one or more of the features recited in the appended claims and/or the following features which, alone or in combination, may comprise patentable subject matter:

The method described herein is a wet chemical etching process using a solution of solvent in the presence of excitation energy to achieve vertical structures including craters or grooves. This method allows processing at reduced temperatures using plastic substrates. The method involves positioning a substrate in a solution of solvent, allowing the top surface of the substrate be covered with a thin layer of the solution, and applying excitation energy to the substrate to direct a removal of a predetermined portion of the substrate. The substrate may be made of any suitable material including an organic polymer. One particularly suitable substrate material is poly-ethylene-terephthalate.

The solution of solvent used herein refers to any suitable solvent that can dissolve the substrate material. For example, the solvent may be di-methyl-formamide, di-chloro-methane, or a mixture thereof. These solvents are particularly useful when the substrate is made of poly-ethylene-terephthalate. The etching process may be performed at solution temperature of about 60° C. to about 150° C. The excitation energy used in the present method may include ultraviolet radiation at any suitable wavelength, for example, a wavelength of about 200 to 400 nm. Particularly effective is a wavelength of about 360 nm. Alternatively, the ultraviolet radiation measured at an intensity of about 0.5 mW/cm$^2$ to about 5.0 mW/cm$^2$ may also be used. The rate of etching of the present method may vary from about 1.0 µm/hr to about 10 µm/hr.

The present method may also include the step of depositing a masking layer onto the substrate prior to subjecting the substrate to the solution of solvent. The masking layer may be made of any material that is not dissolved by the solvent used. A suitable masking material includes a metal or an alloy, such as germanium, copper, or a mixture/combination of germanium and copper. The masking material may be deposited on the substrate by any method known in the art. For example, electron beam evaporation, thermal evaporation, or a combination of the two methods may be used to deposit layers of the same or different masking material onto the substrate surface. The masking procedure may be conducted in a vacuum chamber with a base pressure of about 1×10$^{-6}$ torr. It is understood that the masking material is deposited in a predetermined pattern. The pattern may be created by photolithography or any other method known in the art.

The method described herein may also be used in the fabrication of square membranes, craters, micro-gears, micro-molds, micro-motors and actuators. The method may be used to fabricate a thermocouple device having thermocouples array formed on the substrate prepared according to the method above-described, particularly on the poly-ethylene-terephthalate substrate. The thermocouple array may be produced from different metals or alloys, which may include germanium, copper, aluminum, or a mixture thereof. The thermocouple array may be formed on the substrate using electron beam evaporation in a vacuum chamber at a base pressure of about 1×10$^{-6}$ torr, at a temperature of about 120° C. to about 175° C.

The fabrication technique described herein may also be extended to the production of semiconductor-base logic, memory, and optoelectric devices, and microelectromechanical systems (MEMS). The technique described herein may also be expanded to form micro-molds suitable for electroplating with no need for X-ray lithography.

Additional features of the present disclosure will become apparent to those skilled in the art upon consideration of the following detailed description of preferred embodiments exemplifying the best mode of carrying out the subject matter of the disclosure as presently perceived.

DETAILED DESCRIPTION

Figure 1:
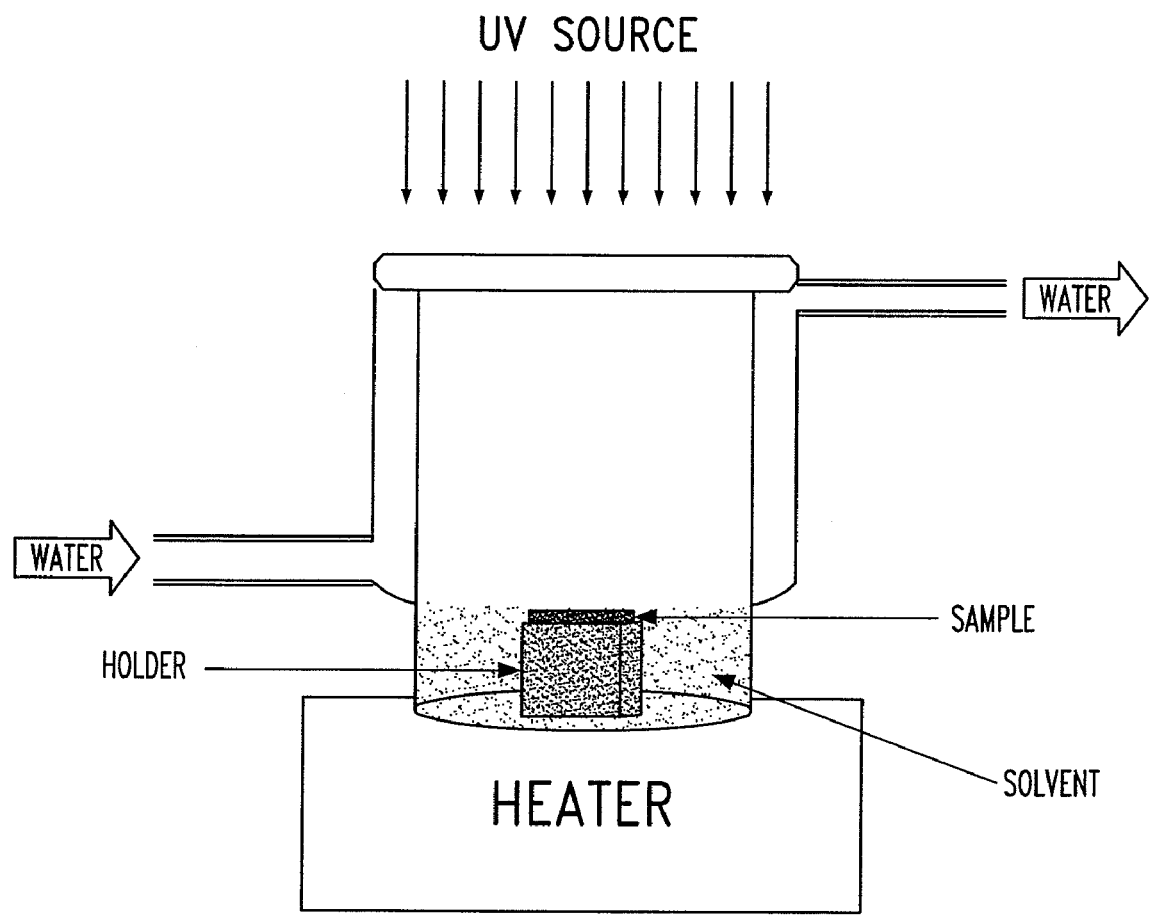
FIG. 1 shows the setup used for etching a substrate positioned in a solution of solvent under ultra-violet exposure.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

In one embodiment, a method of etching a substrate is provided. The method includes positioning the substrate in a solution of solvent so that the top surface of the substrate is as closed to the surface of the solution as possible. The method also includes applying the excitation energy to the surface of the substrate to direct the removal of the substrate.

The substrate to be etched by the method described herein may be a polymer. The substrate my be selected from the group consisting of polyether, polyester, polycarbonate, polyimide, polyamide, polyetherimide, polyethylene, and other organic polymeric materials known to those skilled in the art. The substrate may also be selected form the group of thermoplastics consisting of acrylic, celluloid, polyethylene, polypropylene, polystyrene, polyvinyl chloride, and others known to those skilled in the art. In one specific embodiment, the substrate is made of poly-ethylene-terephthalate. The size and the thickness of the substrate may vary according to the purpose of use. For example, a substrate of about 120 μm thick is suitable for the fabrication of electronic devices. Thinner substrate may also be used to produce a thin membrane for fabrication of a thermocouple.

In another embodiment, the excitation energy applied to the substrate is in the form of ultraviolet radiation. The ultraviolet radiation may be measured in term of wavelength or intensity. A range of wavelength from about 200 nm to about 400 nm is suitable for supporting the present etching process. A wavelength of 360 nm has been shown to be particularly effective. In term of intensity, the ultraviolet radiation at an intensity of about 0.5 mW/cm$^2$ to about 5.0 mW/cm$^2$ has been shown to be useful.

As used herein, a "solution of solvent" may be any liquid that is capable of acting as a dissolving agent. A solution of solvent may include, but is not limited to, any hydrocarbon solvent, acetone, alcohol, formic acid, acetic acid, formamide, carbon tetrachloride, and others known to those skilled in the art. In one specific embodiment, the solution of solvent may be selected from the group consisting of di-methyl-formamide, di-chloro-methane, and a mixture thereof. These solvents are particularly useful when the substrate material is poly-ethylene-terephthalate. It is understood that other solvents may also be suitable, if the solvent can dissolve or remove the substrate material in the presence of an excitation energy. The effective temperature of the solution of solvent during etching may be about 60° C. to about 150° C. It is understood that the temperature may be adjusted based on the solvent, the substrate, or the excitation energy used. With the setup described herein, the method of the present invention may produce an etching rate of about 1.0 μm/hr to about 10 μm/hr.

The present method may further include the step of masking the substrate prior to positioning the substrate in a solution of solvent, in order to protect a predetermined portion of the substrate from exposing to the solvent. In this masked area, the substrate will not be exposed to the excitation energy, and will not be dissolved by the solvent. The masking material that forms the masking layer on the substrate surface may include any metal or any alloy that does not dissolve in the solvent used, especially in the presence of the excitation energy. The masking procedure may be performed according to any method known in the art. For example, germanium and copper may be deposited on the substrate in separate or alternate layers. Germanium may be deposited by an electron beam evaporation procedure and copper may be deposited by a thermal evaporation procedure. The electron beam evaporation and thermal evaporation procedures are performed in a vacuum chamber with a base pressure of about $1 \times 10^{-6}$ torr.

In an exemplary embodiment, the substrate may be loaded in a vacuum chamber to deposit a periodic multi-layer of 300 Å germanium (Ge) and 50 Å copper (Cu). Deposition of the Ge/Cu masking layer may be achieved using electron beam evaporation, thermal evaporation. The Ge/Cu mask has been found to be suitable to protect the PET in the masked areas from exposure to ultraviolet radiation as well as the solution of solvent.

In a specific embodiment, the Ge/Cu mask is formed on the substrate in a predetermined pattern. The masking pattern may be created by photolithography, which is well known in the art. The Ge/Cu mask contains windows to allow the substrate to be exposed to the excitation energy, and subsequently removed to form craters or wells or a predetermined structure having vertical edges. For example, a thin membrane may be formed by removing a top layer of the surface of a substrate. Alternatively, a substrate may be cut into different sizes or shapes by etching the edges off the substrate in a predetermined pattern.

In another embodiment, a method for producing a thermocouple on poly-ethylene-terephthalate is described. The thermocouple array is formed on the substrate produced according to the method above-described. A thermocouple array is fabricated using suitable materials such as metals or alloys. The materials may be selected from the group consisting of germanium, copper, aluminum, and a mixture or a combination thereof. The thermocouple materials may be deposited on the substrate using electron beam evaporation, or thermal evaporation, in a vacuum chamber at a base pressure of about $1\times10^{-6}$ torr. The deposition of the thermocouple material may be undertaken at a temperature range of about 120° C. to about 175° C. It is understood that the temperature range may be lower or higher depending on the thermocouple material used to form the thermocouple array.

In another embodiment, a substrate and a device having a substrate prepared according the method describe herein is provided. The device may be a thermocouple as above-described.

In regard to one illustrative embodiment, a method provided for etching a substrate is performed in an apparatus shown in FIG. 1. The apparatus consists of a water-cooled glass container with a heater to control the temperature of the solution of solvent. The glass wall is water-cooled whereas its bottom is heated to set an appropriate solution temperature. The top lid of the container is made from quartz, allowing transmission of UV photons. The setup used in this technique features the presence of a UV source close to the top quartz lid. The intensity of the UV light has been measured at a wavelength of 360 nm near the sample. A stainless steel holder is used to keep the sample close to the surface of the liquid solution to ensure proper UV exposure. The solution of solvent may be di-methyl-formamide (DMF), di-chloro-methane (DCM), a mixture of di-methyl-formamide and di-chloro-methane (DMF & DCM), or any other solution of solvent known to one skilled in the art.

The following examples are provided for illustrative purposes only and should in no way be construed as limiting the invention.

EXAMPLE 1

Application of PET in UV-Assisted Micromachining

PET substrates used in this experiment are 120 μm thick, cleaned using an RCA #1 solution followed by rinsing in DI water and blow drying. Cleaned samples were loaded in a vacuum chamber to deposit a periodic multi-layer of 300 Å germanium and 50 Å copper. Deposition of the Ge/Cu masking layer was achieved using electron beam evaporation of Ge and thermal evaporation of copper in a vacuum chamber at a substrate temperature of 110° C. and a base pressure of $1\times10^{-6}$ torr. The Ge/Cu film was patterned using photolithography, acting as a masking layer during etching. This mask has been found to be suitable to protect the PET from UV exposure as well as the solvent in the protected areas. Windows in the Ge/Cu film permitted UV-exposure, being dissolved in di-methyl-formamide solution while the masked areas remain intact.

Figure 2:
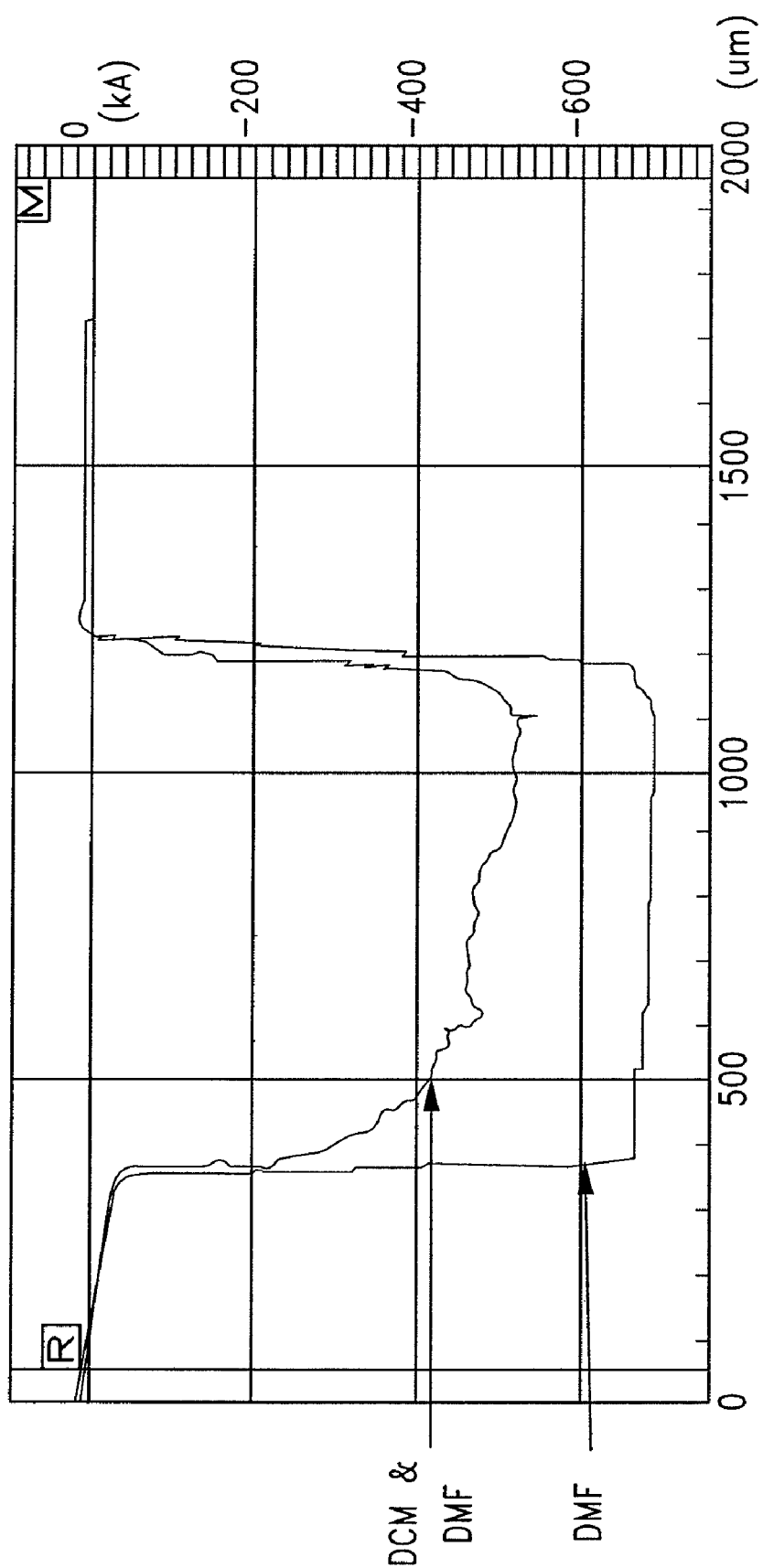
FIG. 2 shows the results of depth profiled for a sample etched in DMF (di-methyl-formamide) solution and DMF& DCM (di-methyl-formamide and di-chloro-methane) solution.

Di-chloro-methane (DCM) has been analyzed as a strong solution of solvent for etching of PET. The addition of DCM as the solution of solvent has degraded the etching behavior, attacked the masking layer, and roughened the crater surface. The profile measurement has been done using DekTak3B stylus profilometer. As shown in FIG. 2, the data for the sample etched with DCM shows a non-uniform etching of the crater whereas the sample treated with DMF releases a smooth and deep crater.

EXAMPLE 2

Effect of UV Radiation Intensity on the Etch Rate of PET

Figure 3:
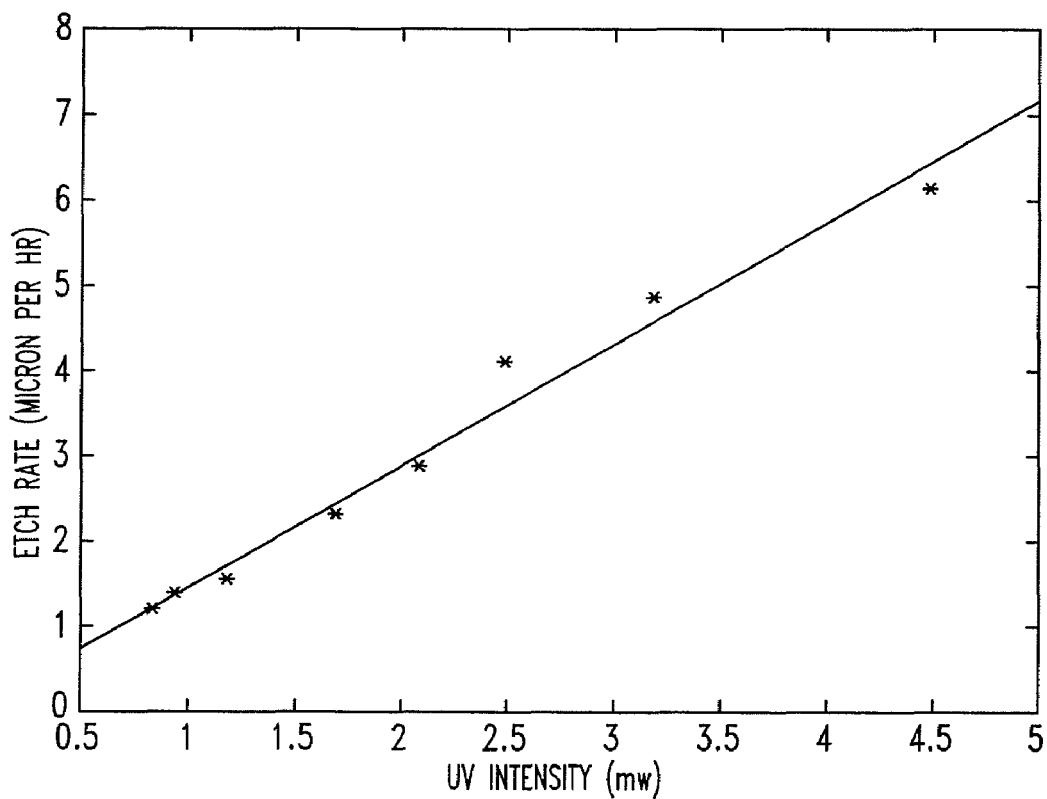
FIG. 3 shows the etch rate of PET with respect to UV radiation intensity, measured at a wavelength of 360 nm and at the location of the sample, evidencing a linear rise with the intensity of UV light. The etch rate was measured at a solution temperature of 110° C.

The etch rate of PET as a function of UV radiation intensity was analyzed at a temperature of 110° C. As shown in FIG. 3, increasing the intensity of UV leads to a monotonic and linear enhancement in the etch rate of the PET substrate. A maximum etch rate of 10 μm/hr has been observed at a temperature of 120° C. and under a UV-illumination of 6 mW/cm$^2$.

EXAMPLE 3

Effect of Solution Temperature on the Etch Rate of PET

Figure 4:
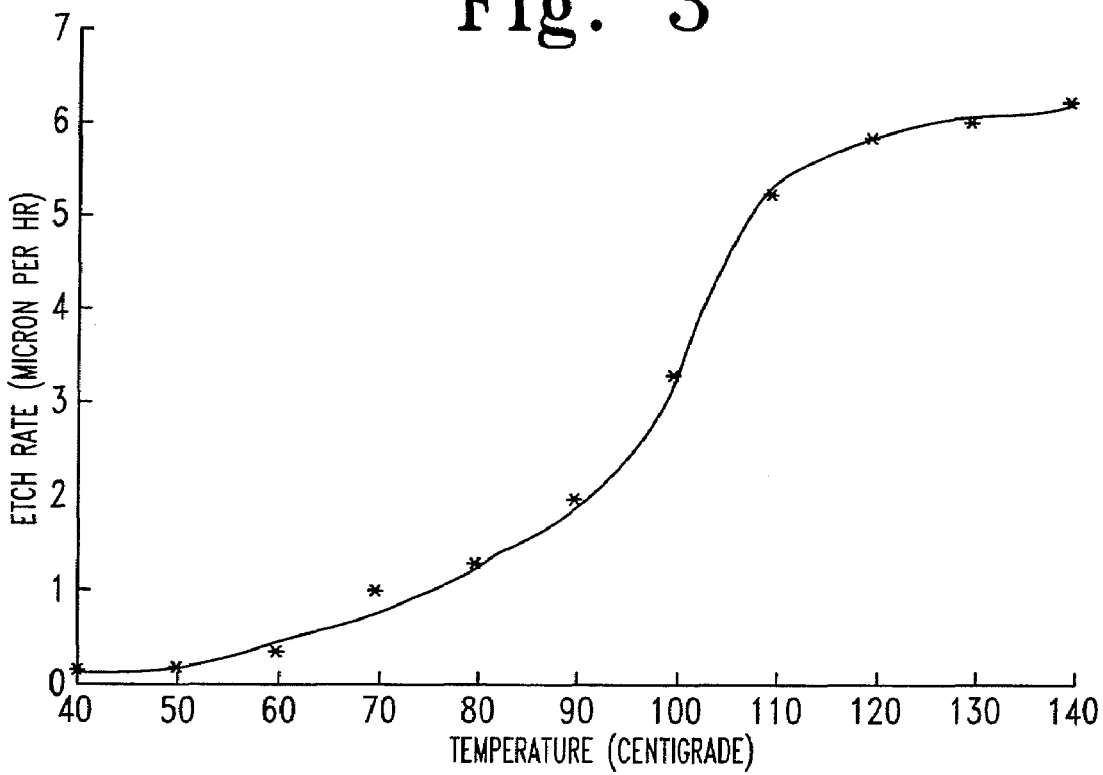
FIG. 4 shows the etch rate of PET with respect to temperature, measured at a UV intensity of 4 mW/cm$^2$.
Figure 5:
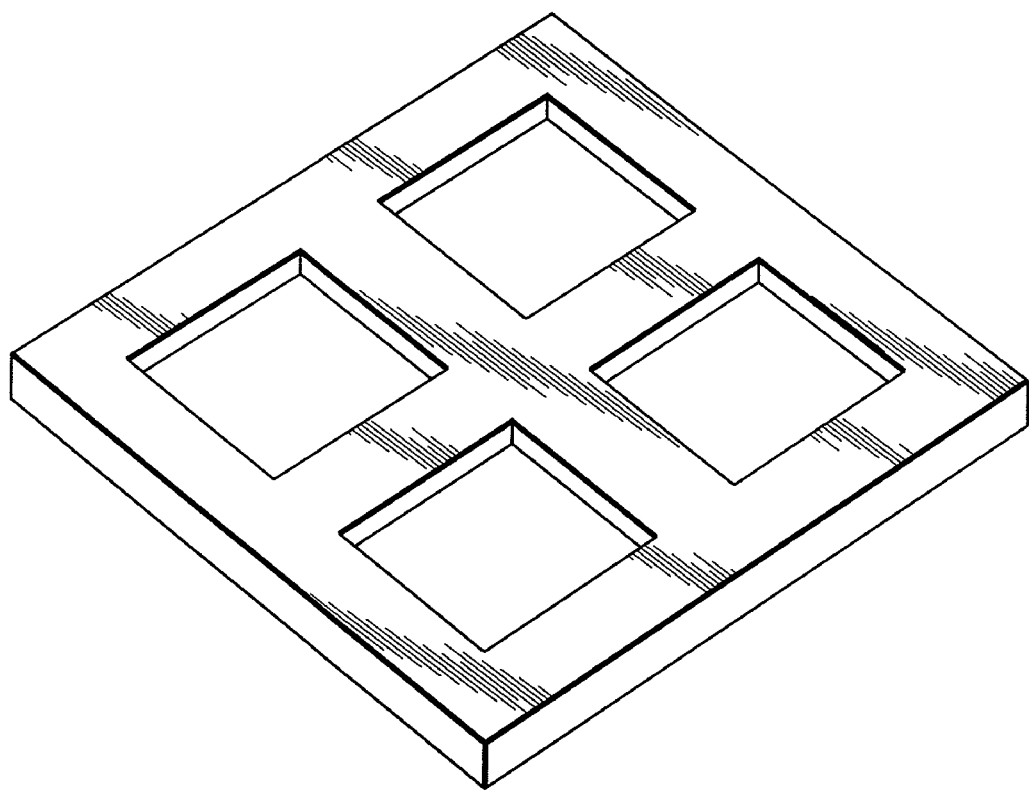
FIG. 5 shows an SEM micrograph of square craters indicating vertical crater walls. The evolution of cracks in the masking layer causes a rough surface of the patterned areas, although the crater bottom remains smooth.

The etch rate of PET as a function of solution temperature was analyzed for a UV intensity of 4 mW/cm$^2$. As shown in FIG. 4, by raising the temperature to 60° C. etching begins, whereas at lower temperatures the etch rate is insignificant. At a temperature of 120° C. an etch rate of 6 μm/hr has been observed. However, at temperatures higher than 120° C., considerable substrate warping has been observed, hampering the etching process. At temperatures ranging from 70° C. to 120° C. a monotonic increase in the etch rate is observed without any damage to the substrate after an extended etching period of ten hours. Higher temperatures lead to a saturation of the etching process, although rates as high as 10 μm/hr have been observed. The etch rate shows a small drop especially after six hours of etching. This could be due to saturation of the solution and has been resolved using fresh solution after five to six hours of operation.

EXAMPLE 4

Method of Etching PET to Produce a Micro-Gear

Figure 6:
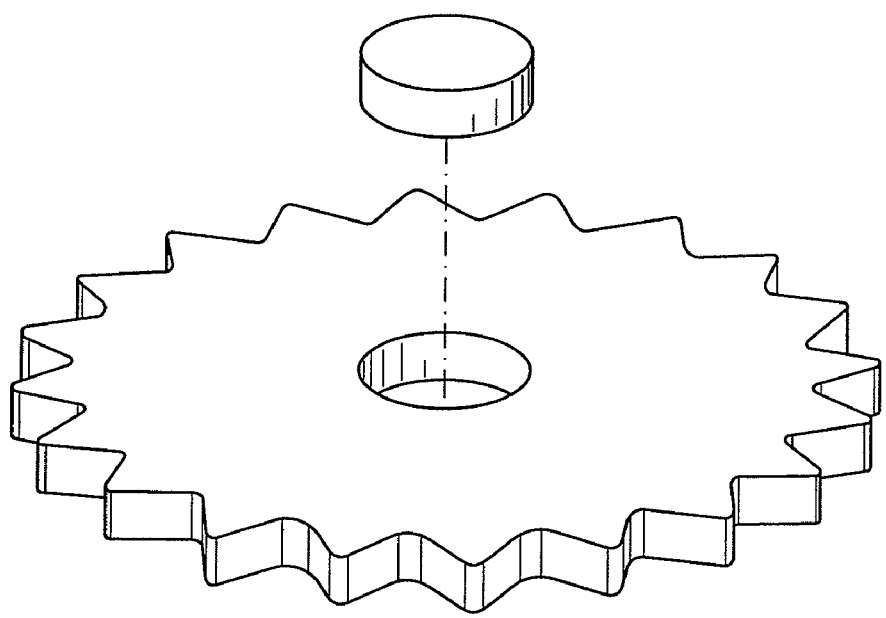
FIG. 6 shows an SEM image of a micro-gear made using the method described herein. The thickness of the gear is 60 μm and the diameter is 500 μm. The insert shows an axle for use in rotational applications.
Figure 7:
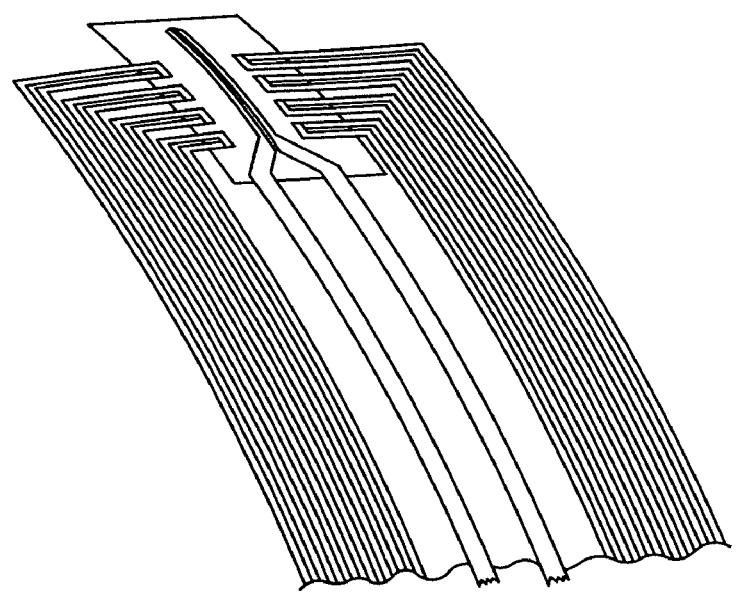
FIG. 7 shows an optical image of a Ge/Al thermocouple array fabricated on PET under an intentional bent.
Figure 8:
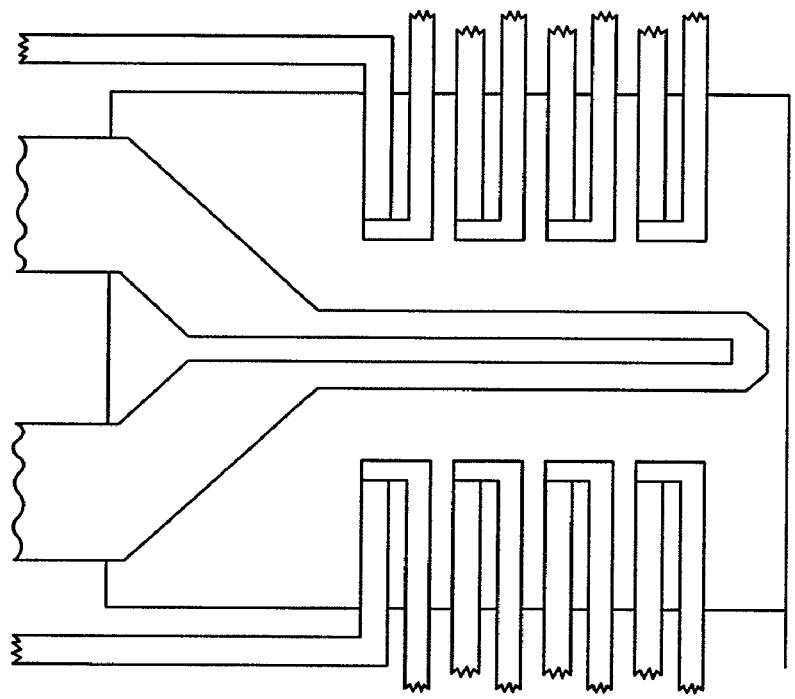
FIG. 8 shows thermocouples formed on a 20 μm-thick, square PET membrane.

As shown in FIG. 6, a micro-gear may be produced using the method described herein. The thickness of the gear is 60 μm and the diameter is 500 μm. The sharp edges of the gear indicate anisotropic vertical etching of the PET substrate. The insert shown in FIG. 6 is an axle which may be suitable for use in rotational applications. The axle was prepared using similar etching conditions to those described above. A more detailed examination of the SEM image shows an undercut of 1 μm in a 60 μm crater. The masking layer has survived a twelve-hour etching process.

EXAMPLE 5

Fabrication of Thermocouples on PET

The method described herein has also been used to realize Ge/Al thermocouples on PET substrates. Al has been used as a pair of thermocouple junctions due to its compatibility with PET. Membranes with a thickness of 20 μm have been realized using the UV-assisted etching technique, carried out from the back side of the thermo-arrays. Thermocouple devices may be used in applications including simple temperature monitoring devices to biosensors and infrared detectors. The method described may be possible for the realization of flexible infrared thermocouple detectors.

A sandwich of 0.1 μm germanium, 50 Å copper, and 0.1 μm germanium was deposited on PET using electron beam evaporation. This sandwich comprises the main portion of the fabricated thermocouples. In addition, germanium and aluminum arms with 20 μm width and 1 mm length form arrays of three to ten thermocouples in series. Deposition of these components on PET was performed in a vacuum chamber at a temperature of 110° C. and a base pressure of $1\times10^{-6}$ torr. Since germanium as deposited on the substrate is amorphous, a metal induced crystalline technique was used to form polycrystalline films. The flexible substrate was subjected to compressive and tensile strain at temperatures as low as 135° C. to enhance crystallinity. External strain reduced the annealing temperature allowing fabrication of thermocouples on PET. The crystallization was confirmed using X-ray diffractometer (XRD) and scanning electron microscope (SEM).

The essence of the thermocouple device described herein lays on the Seebeck effect where slight variations in temperature yield developing a measurable voltage across the junction. A Seebeck value of 100 μV/° C. was extracted for the Ge/Al junctions described herein. Thermocouples produced from the described method show superior performance over metallic thermocouples due to the higher Seebeck factor of the Ge/Al junctions.

A number of patent and literature references are cited in the foregoing specification, as relevant to the state of the art to which this invention pertains. The disclosures of all of those citations are incorporated by reference herein.

While certain embodiments of the present invention have been described and/or exemplified above, various other embodiments will be apparent to those skilled in the art from the foregoing disclosure. Accordingly, the present invention is not limited to the particular embodiments described and/or exemplified, but is capable of considerable variation and modification without departure from the scope of the appended claims.

REFERENCES

P. Apel, "Track etching technique in membrane technology," *Radia. Meas.*, vol. 34. pp. 559-566, 2001

M. Dadsetan, H. Mirzadeh, and N. Sharifi, "Éffect of $CO_2$ laser radiation on the surface properties of polyethylene terephthalate," *Radiat. Phys. Chem.*, vol. 56, pp. 597-604, 1999

H. Dreuth and C. Hieden, "Thermoplastic structuring of thin polymer films," *Sens. Actuators*, vol. A.78, pp. 198-204, 1999

E. Fortunator, I. Ferreira, F. Giuliani, R. Martins, "Large area flexible thin position sensitive detectors," *Sensors & Actuators A*, 86, pp. 182-186, 2000

R. X. Gao, J. Fang, B. Rao, and R. 0. Warringtoon, "Miniaturized surface-driven electrostatic actuators: design and performance evaluation," *IEEE Trans. Mechatronics*, vol. 2, pp. 1-7, March 1997

M. Iwanishi, T. Harima, and Y. Iijima, "In depth anaysis of polymer etching by hydrogen plasma," in *The Japan Society for Analytical Chemistry*, vol. 17, Analytical Sciences, pp. i391-i393, 2001

V. P. Nazmov et al., "Influence of irradiation of poly-ethylene-terephthalate films with X-ray upon the rate of dissolution in alkali water solution," in *Nuclear Instruments and Methods in Physics Research*, vol. B173, pp. 311-318, 2001

P. Ragsten et al., "Electrostatically excited diaphragm driven as a loud-speaker," *Sens. Actuators*, vol. A.52, pp. 211-215, 1996

M. A. Roberts et al., "UV laser machined polymer substrates for the development of microdiagnostic systems," *Anal. Chem.*, vol. 69, pp. 2035-2042, 1997

J. S. Rossier et al., "Plasma etched polymer microelectrochemical systems," *LAB on Chip*, vol. 2, pp. 145-150, 2002

T. Stechenreiter et al., "Solvent-induced sensitization of ion tracts in PET analyzed by small-angle X-ray scattering and differential scanning calorimetry," in *Nuclear Instrument: Elsevier*, pp. 200-203, 1995

M. Toufik, A. Mas, V. Shkinev, A. Nechaev, A. Elharfi, F. Schue, "Improvement of Performance of PET Track Membranes by Plasma Treatment," *European Polymer Journal*, No. 38, pp. 203-209, 2002

P. Van Gerwen, T. Slater, J. B. Chevrier, K. Beart, R. Mertens, "Thin-film Boron-doped Polycrystalline Silicon 70%—Germanium 30% for Thermopoles," *Sensors and Actuators A*, 53, pp. 325-329, 1996

A. I. Vilenskey, D. I. Zagorski, and S. A. Bystrove, "Investigation of latent tracks in poly-ethylene-terephthalate and their etching," *Surface Science*, vol. 507-510, pp. 911-915, 2002

A. V. Wagner, R. J. Foreman, L. J. Summers, T. W. Barbee, and J. C. Farmer, "Fabrication and Testing of Thermoelectric Thin Film Devices," *IEEE*, 15$^{th}$ International conference on Thermoelectrics, 1990

What is claimed is:

1. A method of etching a substrate; comprising:
    depositing a Ge—Cu masking layer in a predetermined pattern on a poly-ethylene-terephthalate ("PET") substrate;
    positioning the PET substrate having the Ge—Cu masking layer in a solution of solvent, wherein the solution of solvent is selected from the group consisting of di-methyl-formamide, di-chloro-methane, and a mixture thereof;
    passing UV excitation energy through a quartz filter that is spaced from the solution of solvent; and
    applying the UV excitation energy to the PET substrate having the Ge—Cu masking layer after it passes through the quartz filter to remove portions of the PET substrate that are exposed to the solution of solvent in the presence of the UV excitation energy.

2. The method of claim 1, wherein the PET substrate having the Ge—Cu masking layer is positioned in the solution of solvent such that a top surface of the PET substrate having the Ge—Cu masking layer is relatively close to a top surface of the solution of solvent.

3. The method of claim 1, wherein the masking layer is deposited onto the substrate in a vacuum chamber with a base pressure of about $1\times10^{-6}$ torr.

4. The method of claim 1, wherein the predetermined pattern is created by photolithography.

5. A method of producing a thermocouple device comprising:
    depositing a Ge—Cu masking layer in a predetermined pattern on a poly-ethylene-terephthalate ("PET") substrate;
    positioning the PET substrate having the Ge—Cu masking layer in a solution of solvent such that a top surface of the PET substrate having the Ge—Cu masking layer is positioned as close to a top surface of the solution of solvent as possible, wherein the solution of solvent is selected from the group consisting of di-methyl-formamide, di-chloro-methane, and a mixture thereof;
    passing UV excitation energy through a quartz filter;
    applying the UV excitation energy to the PET substrate having the Ge—Cu masking layer after it passes through the quartz filter to remove portions of the PET substrate that are exposed to the solution of solvent in the presence of the UV excitation energy to form a prepared substrate; and forming a thermocouple array on the prepared substrate.

6. The method of claim 5, wherein the thermocouple array is produced from metals or an alloys selected from the group consisting of germanium, copper, aluminum, and a mixture thereof.

7. The method of claim 5, wherein the thermocouple array is formed on the prepared substrate in a vacuum chamber at a base pressure of about $1 \times 10^{-6}$ torr.

8. A method of etching a substrate; comprising:

positioning a PET substrate in a solution of solvent, wherein the solution of solvent is selected from the group consisting of di-methyl-formamide, di-chloromethane, and a mixture thereof;

passing UV excitation energy through a quartz filter that is spaced from the solution of solvent;

applying the UV excitation energy to the PET substrate after it passes through the quartz filter to remove portions of the PET substrate that are exposed to the solution of solvent in the presence of the UV excitation energy, and depositing a Ge—Cu masking layer in a predetermined pattern on the PET substrate prior to applying the UV excitation energy to the PET substrate.

9. The method of claim 8, wherein the masking layer is deposited onto the substrate in a vacuum chamber with a base pressure of about $1 \times 10^{-6}$ torr.

10. The method of claim 8, wherein the predetermined pattern is created by photolithography.

* * * * *